United States Patent
Sasaki

(10) Patent No.: US 11,009,377 B2
(45) Date of Patent: May 18, 2021

(54) MEASURING APPARATUS

(71) Applicant: YOKOGAWA ELECTRIC CORPORATION, Musashino (JP)

(72) Inventor: Keiichi Sasaki, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 209 days.

(21) Appl. No.: 16/162,728

(22) Filed: Oct. 17, 2018

(65) Prior Publication Data
US 2019/0145801 A1 May 16, 2019

(30) Foreign Application Priority Data
Nov. 16, 2017 (JP) .............................. JP2017-221187

(51) Int. Cl.
| | | |
|---|---|---|
| *G01D 11/24* | (2006.01) | |
| *G01H 17/00* | (2006.01) | |
| *G06F 1/18* | (2006.01) | |
| *H01M 50/213* | (2021.01) | |

(52) U.S. Cl.
CPC .......... *G01D 11/245* (2013.01); *G01H 17/00* (2013.01); *G06F 1/188* (2013.01); *H01M 50/213* (2021.01)

(58) Field of Classification Search
CPC ...... G01D 11/00; G01D 11/24; G01D 11/245; G01H 17/00; G06F 1/18; G06F 1/188; H01M 2/10; H01M 2/1055
See application file for complete search history.

(56) References Cited

U.S. PATENT DOCUMENTS

| | | | | |
|---|---|---|---|---|
| 3,945,193 | A | * 3/1976 | Yasuda | .................. G04C 10/00 368/88 |
| 5,065,035 | A | 11/1991 | Juengel | |
| 2007/0020512 | A1 * | 1/2007 | Wakuda | ................. B65D 71/70 429/99 |
| 2007/0201192 | A1 | 8/2007 | McGuire et al. | |
| 2013/0208437 | A1 | 8/2013 | Balle et al. | |
| 2017/0183852 | A1 * | 6/2017 | Guthrie | ................. F16K 21/185 |

FOREIGN PATENT DOCUMENTS

| | | | |
|---|---|---|---|
| CN | 101427400 A | 5/2009 | |
| EP | 0866509 A2 | 9/1998 | |
| EP | 2517473 B1 | 4/2013 | |
| JP | 2016102767 A | * 6/2016 | ............... G01K 7/00 |

OTHER PUBLICATIONS

Extended European Search Report dated Mar. 21, 2019, issued in counterpart EP Application No. 18201645.1. (7 pages).

* cited by examiner

*Primary Examiner* — Nguyen Q. Ha
(74) *Attorney, Agent, or Firm* — Westerman, Hattori, Daniels & Adrian, LLP

(57) ABSTRACT

A measuring apparatus includes a base portion attachable to an attachment target object and a cover portion configured to be detachably attached to the base portion to accommodate a rod-shaped replaceable object inside the cover portion, and the cover portion includes a holding portion configured to hold the replaceable object with the cover portion attached to the base portion.

12 Claims, 10 Drawing Sheets

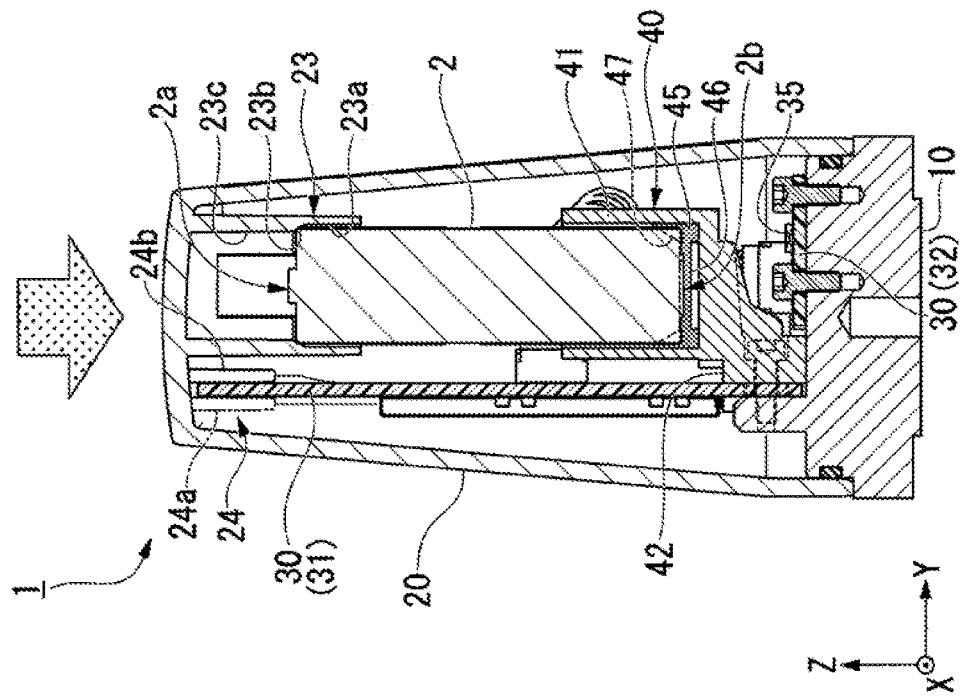
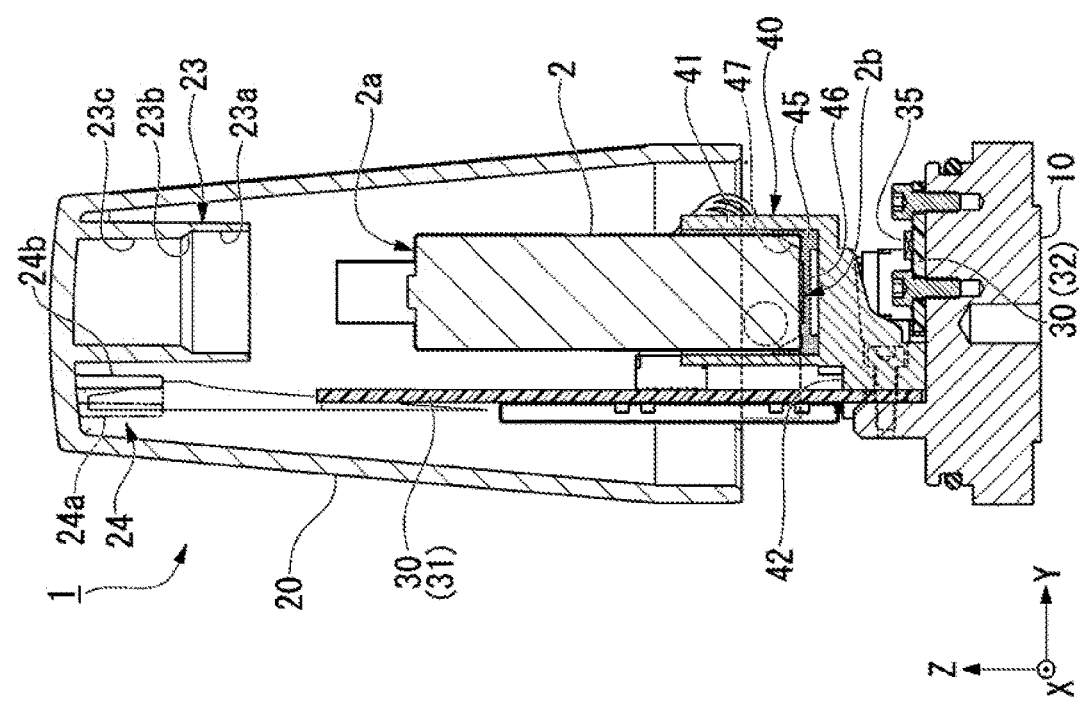

MEASURING APPARATUS

CROSS-REFERENCE TO RELATED APPLICATION

This application is based upon and claims the benefit of priority from Japanese Patent Application No. 2017-221187 filed on Nov. 16, 2017, the entire disclosure of which is incorporated herein by reference.

TECHNICAL FIELD

This disclosure relates to a measuring apparatus.

BACKGROUND

Patent Literature 1 (PTL 1) below discloses a measuring apparatus configured to monitor the conditions of mechanical equipment within a combustible gas or explosive gas environment. This measuring apparatus is a radio sensor connected to a radio network where the radio sensor can transmit a detected physical parameter. The measuring apparatus includes a vibration sensor, a processor, a radio transmitter, a battery and a base portion where these constituent elements are mounted, as well as a cover portion attached to the base portion, configured to cover the equipment mounted on the base portion. The battery is fastened to a substrate supported on the base portion with a clamp. The processor and a radio communication device or the like are mounted on the substrate.

CITATION LIST

Patent Literature

PTL 1: EP2517473B1

SUMMARY

The battery disposed inside the cover portion of the measuring apparatus described above is a consumable article and hence needs to be replaced periodically. For replacement, conventionally, the cover portion is removed from the base portion. Further, the clamp member, which fastens the battery to the substrate with a clamp, needs to be removed using a screwdriver. As the case of the battery, with respect to the fixing structure of a rod-shaped replaceable object, such as a battery, many constituent components are involved, some labor hours have to be spent replacing the fixed replaceable object, and the structure becomes complex, leading to high costs.

An object of the disclosure is to provide a measuring apparatus that can reduce the number of components involved in a fixing structure for a rod-shaped replaceable object to realize an easy replacing operation of the replaceable object and low costs.

According to some embodiments of the disclosure, there is provided a measuring apparatus including a base portion attachable to an attachment target object and a cover portion configured to be detachably attached to the base portion to accommodate a rod-shaped replaceable object inside the cover portion, wherein the cover portion has a holding portion configured to hold the replaceable object with the cover portion attached to the base portion.

According to this configuration, the holding portion configured to hold the rod-shaped replaceable object is provided on the cover portion which is detachably attached to the base portion. This obviates the necessity of preparing a separate clamp member or the like and enables the replaceable object to be fixed in place by attaching the cover portion to the base portion. This can not only reduce the number of components involved in the fixing structure for the rod-shaped replaceable object but also facilitate the replacing operation of the replaceable object, thereby making it possible to realize low costs.

According to one embodiment, the base portion includes a receiving portion configured to support a longitudinally bottom portion of the replaceable object, and the holding portion is brought into engagement with a longitudinally top portion of the replaceable object which is not supported by the receiving portion.

According to this configuration, both ends of the longitudinally bottom portion and the longitudinally top portion of the replaceable object can be fixed in place, whereby the rod-shaped replaceable object can be fixed in place stably in a perpendicular posture.

According to one embodiment, the holding portion has a cylindrical shape enabling the holding portion to be brought into engagement with the top portion in a direction m which the cover portion is attached to or detached from the base portion.

According to this configuration, the direction in which the cover portion is attached to or detached from the top portion coincides With the engaging direction of the holding portion with the top portion of the replaceable object. Hence, the holding portion can be brought into engagement with or disengagement from the top portion at the same time as the cover portion is attached to or detached from the base portion. This facilitates the replacing operation of the replaceable object.

According to one embodiment, the holding portion has a diametrically contracted portion whose inside diameter is gradually reduced as the holding portion extends towards the top portion in the direction in which the cover portion is attached or detached, with the cover portion attached to the base portion.

According to this configuration, even though an outer diametrical dimension of the top portion of the replaceable object varies, the top portion of the replaceable object can be fixed stably since the diametrically contracted portion provided on the holding portion can be tightly secured to the top portion of the replaceable object.

According to one embodiment, the receiving portion has an elastic portion configured to be brought into abutment with the bottom portion, the elastic portion being elastically deformable in a direction in which the cover portion is attached to or detached from the base portion.

According to this configuration, even though a longitudinal dimension of the replaceable object varies, the attachment of the cover portion to the base portion is not interrupted since the elastic portion provided on the receiving portion deforms elastically. Thus, the replaceable object can be fixed by absorbing a variation in the longitudinal dimension of the replaceable object, if any, by an elastic deformation of the elastic portion.

According to one embodiment, a space is formed between a main body of the receiving portion and the elastic portion, the space being configured to allow an elastic deformation of the elastic portion.

According to this configuration, when the elastic portion deforms elastically, part of the elastic portion can be relieved into the space formed between the main body of the receiving portion and the elastic portion, increasing the amount of deformation of the elastic portion in the direction in which the cover portion is attached or detached. This prevents the interruption of attachment of the cover portion to the base portion even though the longitudinal dimension of the replaceable object varies largely, whereby the replaceable object can be fixed by absorbing a variation in the longitudinal dimension of the replaceable object, if any, by an elastic deformation of the elastic portion.

According to one embodiment, the receiving portion has a main body portion having a bottomed cylindrical shape on a bottom surface of which the elastic portion is provided, and the elastic portion has a diametrically contracted elastic portion whose inside diameter is gradually reduced as the elastic portion extends towards the bottom surface of the main body portion in the direction in which the cover portion is attached or detached in its restored state where the elastic portion is not in abutment with the bottom portion.

According to this configuration, even though an outer diametrical dimension of the bottom portion of the replaceable object varies, the bottom portion of the replaceable object can be supported stably since the diametrically contracted elastic portion provided on the elastic portion can be tightly secured to the bottom portion of the replaceable object.

According to one embodiment, the measuring apparatus includes a substrate on which a communication part is provided, the communication part being configured to transmit a measurement result of a sensor to outside, an engagement mechanism configured to bring the substrate into engagement with the receiving portion and an attachment mechanism configured to attach integrally the substrate and the receiving portion which are brought into engagement with each other by the engagement mechanism to the base portion.

According to this configuration, the substrate including the communication part and the receiving portion supporting the replaceable object can integrally be attached to the base portion while being in engagement with each other. This can reduce the number of components involved more than in a structure in which the substrate and the receiving portion are separately and individually attached to the base portion, thereby making it possible to realize low costs.

According to one embodiment, the substrate is attached to the base portion in an erected state, and the cover portion includes a substrate holding portion configured to hold an upper end portion of the substrate.

According to this configuration, the cover portion also holds the upper end portion of the substrate together with the replaceable object. Hence, an attaching direction of the cover portion to the base portion can be understood easily, whereby the cover portion can be prevented from being attached to the base portion in the reverse direction, and the cover portion can easily and simply be attached to the base portion.

According to one embodiment, the replaceable object is a battery.

According to this configuration, the number of components involved in the fixing structure for the battery which is the rod-shaped replaceable object can be reduced, and the replacing operation of the battery can be facilitated.

According to one embodiment, the cover portion includes a string attachment hole configured to allow attachment to the attachment target object via a string-shaped member.

According to this configuration, the measuring apparatus can be kept fastened to the attachment target object with the string-shaped member by passing the string-shaped member through the string attachment hole of the cover portion. Hence, the measuring apparatus can be prevented from falling off the attachment target object and being lost or being damaged as a result of the fall off the attachment target object.

According to the disclosure that has been described heretofore, the measuring apparatus can be provided which can reduce the number of components involved in the fixing structure for the rod-shaped replaceable object and realize the easy replacing operation of the replaceable object and low costs.

BRIEF DESCRIPTION OF THE DRAWINGS

In the accompanying drawings:

FIG. 9A is a schematic drawing illustrating a method of attaching the cover portion to the base portion of the measuring apparatus illustrated in FIG. 1;

FIG. 9B is a schematic drawing illustrating the method of attaching the cover portion to the base portion of the measuring apparatus illustrated in FIG. 1.

DETAILED DESCRIPTION

Hereinafter, an embodiment of the disclosure will be described by reference to the drawings.

Figure 1:
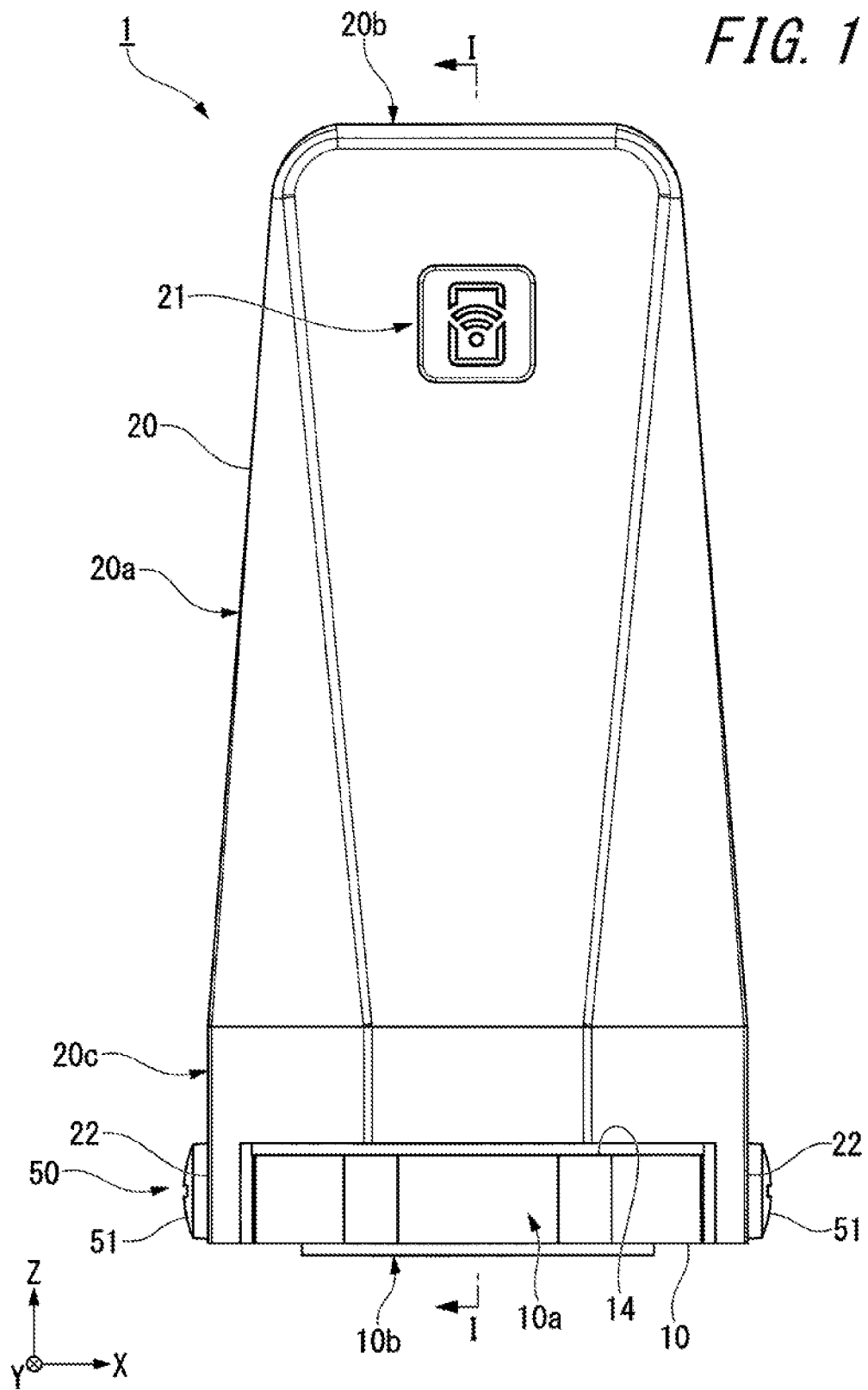
FIG. 1 is a front view of a measuring apparatus of an embodiment of the disclosure.
Figure 2:
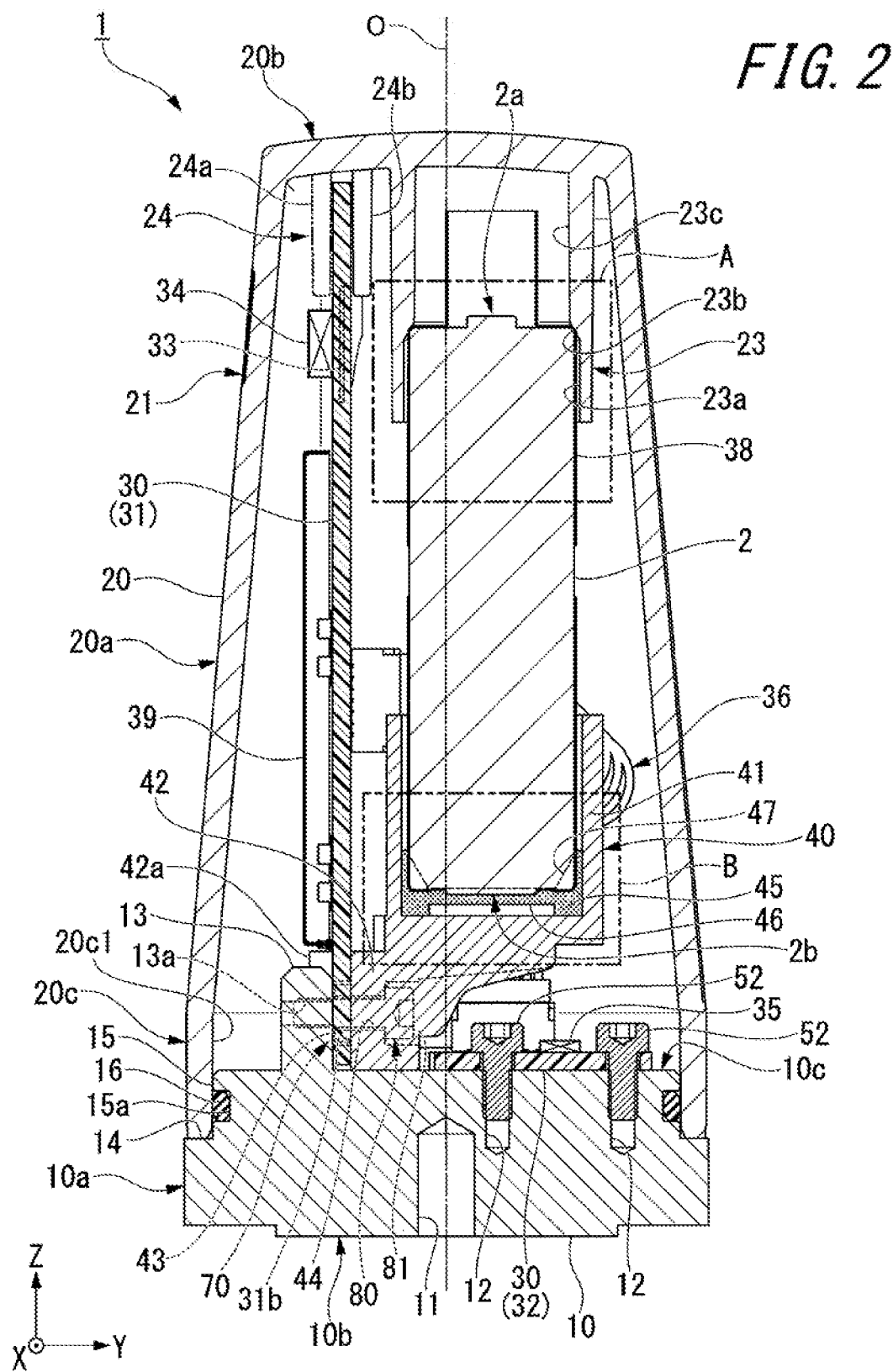
FIG. 2 is a sectional view of the measuring apparatus taken along a line I-I in FIG. 1.

A measuring apparatus 1 includes a base portion 10 and a cover portion 20 as illustrated in FIG. 1 and accommodates a substrate 30 inside the cover portion 20 as illustrated in FIG. 2, and a battery 2 (a rod-shaped replaceable object), a first antenna 33, a second antenna 34 and a sensor 35 are mounted on the substrate 30. In this embodiment, while the battery 2 is described as being the rod-shaped replaceable object, in a case, for example, where the measuring apparatus 1 includes an insertable storage module such as a stick-shaped USB memory, sensor data obtained by the sensor 35 is accumulated in the storage module, and the accumulated sensor data is taken out periodically by opening the cover portion 20, the storage module may be configured as the replaceable object.

Figure 5:
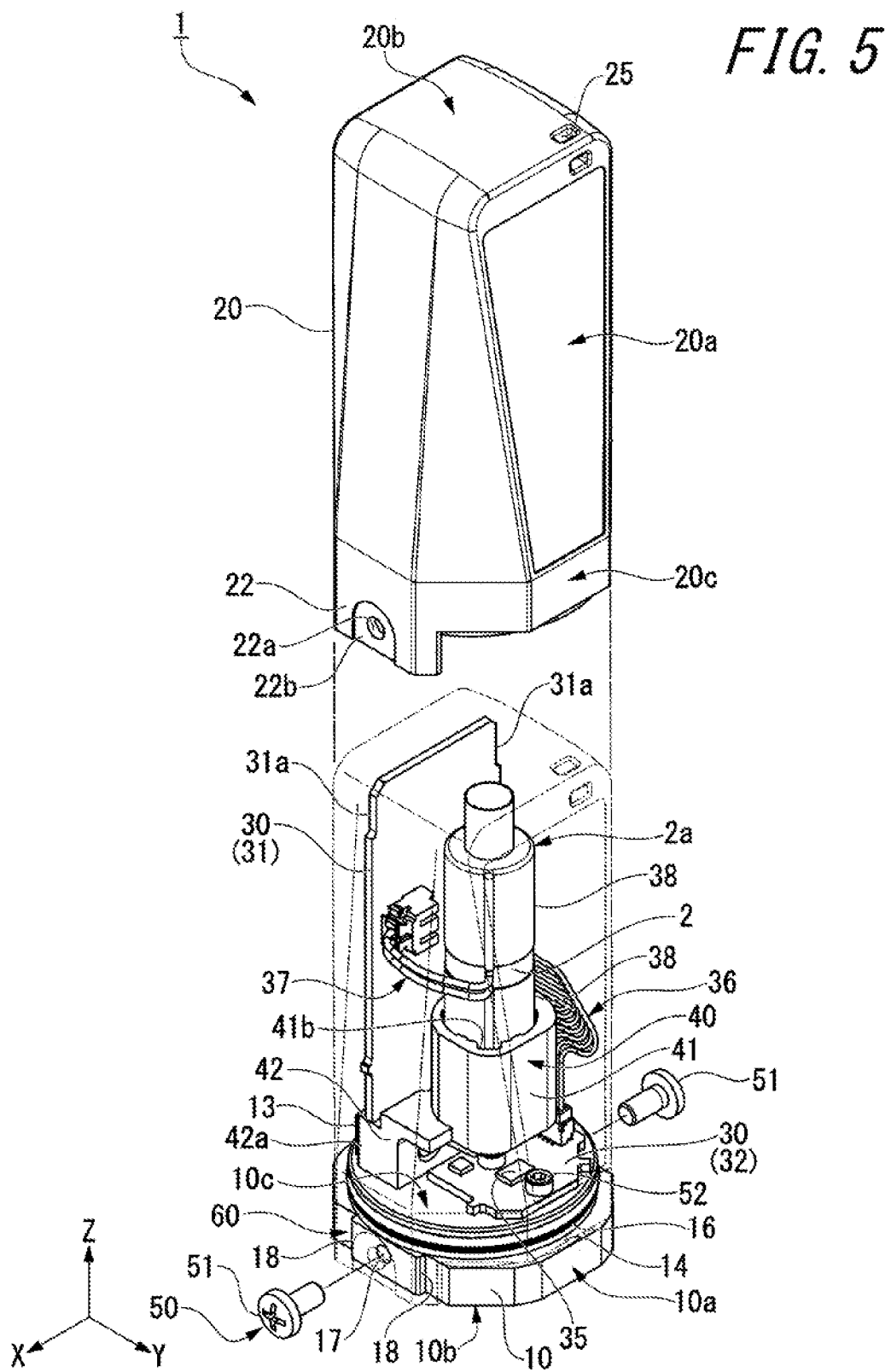
FIG. 5 is a rear exploded perspective view of the measuring apparatus illustrated in FIG. 1.

As illustrated in FIG. 5, the base portion 10 has a circular disc shape, and the cover portion 20 has a topped cylindrical shape. In the following description, an X-Y-Z orthogonal coordinate system is set, so that positional relationships among the constituent members are described while referring to this X-Y-Z orthogonal coordinate system from time to time. A center axis O (refer to FIG. 2) is shared commonly by the base portion 10 having the circular disc shape and the cover portion 20 having the topped cylindrical shape. Then, a direction in which the commonly shared center axis O extends will be referred to as a Z-axis direction, a direction which is at right angles to the Z-axis direction will be referred to as an X-axis direction, and a direction which is at right angles to both the Z-axis direction and the X-axis direction will be referred to as a Y-axis direction. The X-axis direction denotes a left-and-right direction of the measuring apparatus 1, the Y-axis direction denotes a front-and-rear direction of the measuring apparatus 1, and the Z-axis direction denotes a height direction of the measuring apparatus 1.

The base portion 10 constitutes a bottom portion of the measuring apparatus 1 as illustrated in FIG. 1. The base portion 10 is made up of a circular disc-shaped metallic material. An outer circumferential surface 10a of the base portion 10 has a polyhedral shape. A screw hole 11 is formed in a bottom surface 10b of the base portion 10 as illustrated in FIG. 2. The screw hole 11 is provided to screw the measuring apparatus 1 to an attachment target object (for example, an electric motor 100 illustrated in FIG. 10). The screw hole 11 is disposed concentrically with the center axis O, and the base portion 10 can be screwed up or down by gripping on the polyhedral outer circumferential surface 10a with a wrench.

Screw holes 12 are formed in a top surface 10c of the base portion 10 to fix the substrate 30 (a second substrate 32) to the base portion 10. The screw holes 12 are formed individually in two positions which evade the screw hole 11 as seen from above the base portion 10, whereby the second substrate 32 on which the sensor 35 is mounted can be screwed down to the base portion 10 in a replaceable fashion. The sensor 35 is intended to measure a physical parameter of the attachment target object, and in this embodiment, the sensor 35 is designed to measure vibrations of the attachment target object. In addition to the sensor configured to measure vibrations, the sensor 3 may be a sensor configured to measure various types of physical parameters such as temperature, humidity, pressure, speed, acceleration and revolution speed, for example.

A fixing portion 13 is formed on the top surface 10c of the base portion 10. This fixing portion 13 is configured to fix in place the first substrate 31, on which the first antenna 33 and the second antenna 34 are mounted, and a receiving portion 40, which will be described later. The fixing portion 13 constitutes a projecting wall portion which is erected perpendicularly with respect to the top surface 10c and is disposed in a position lying spaced away in the Y-axis direction (a −Y side) from the center axis O. The fixing portion 13 extends in the X-axis direction, and two screw holes 13a, which penetrate the fixing portion 13 in the Y-axis direction, are formed at two locations so as to be spaced apart from each other in the X-axis direction (refer to FIG. 7).

As illustrated in FIG. 2, a step portion 14, which is stepped down one level with respect to the top surface 10c, is formed on a circumferential edge portion of the base portion 10 which is situated on a top surface 10c side of the base portion 10. A bottom portion 20c of the cover portion 20 is seated on the step portion 14. Being different from the polyhedral outer circumferential surface 10a, a second outer circumferential surface 15 of the base portion 10 where the step portion 14 is formed is formed into a cylindrical curved surface. An annular groove 15a is formed on the second outer circumferential surface 15, and a seal ring 16 is disposed in this annular groove 15a.

The substrate 30 includes the first substrate 31 and the second substrate 32. The first substrate 31 is fixed to the fixing portion 13 and is erected perpendicularly with respect to the top suffice 10c of the base portion 10. The second substrate 32 is disposed on the top surface 10c of the base portion 10 and is fixed to the top surface 10c with screws 52 which screw into the corresponding screw holes 12. The sensor 35 described above is mounted on the second substrate 32. The first antenna 33 for near distance communication and the second antenna 34 for far distance communication are mounted on the first substrate 31.

The first substrate 31 and the second substrate 32 are electrically connected together by way of a first connector cable 36 as illustrated in FIG. 5. The first substrate 31 is electrically connected to the battery 2 by way of a second connector cable 37. This enables electric power to be supplied from the battery 2 to the sensor 35. The second connector cable 37 is connected to a terminal, not illustrated, which connects to a top portion 2a (+) of the battery 2 and a terminal, not illustrated, which connects to a bottom portion 2b (−) of the battery 2 by way of two cables. The top portion 2a and the bottom portion 2b of the battery 2 are covered with a thermally shrinkable tube 38 configured to fix those terminals, not illustrated. Additionally, a shield 39 configured to protect other electronic equipment, not illustrated, such as a processor (refer to FIG. 2) and an insulation seal, not illustrated, are attached to the substrate 30.

Figure 3:
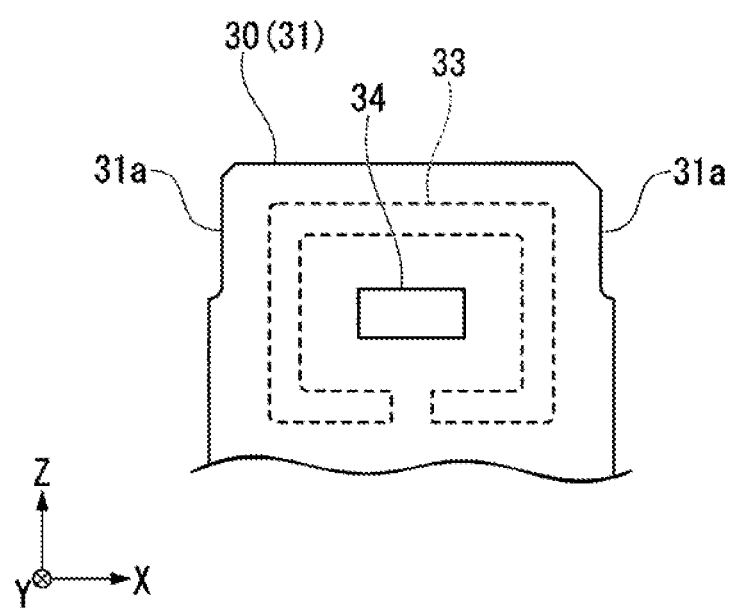
FIG. 3 is a front view of a first antenna and a second antenna mounted on a substrate provided on the measuring apparatus illustrated in FIG. 1.

As illustrated in FIG. 3, the first antenna 33 constitutes a loop antenna which is embedded in the first substrate 31, and the second antenna 34 constitutes a chip antenna which is disposed inside the loop antenna. The first antenna 33 may be formed on a surface of the first substrate 31. The second antenna 34 is designed to transmit a measurement result (sensor data) obtained by the sensor 35 to an outside of the cover portion 20. Thus, the second antenna 34 transmits sensor data to outside by way of a radio network, not illustrated, for example. The first antenna 33 is designed to execute provisioning through non-contact communication. The provisioning is a process of performing necessary settings to allow the measuring apparatus 1 to join the radio network.

The first antenna 33 executes transmission through near field communication (NFC). NFC means a communication (a non-contact communication) which can be executed when communication devices are spaced several tens centimeters or less apart from each other. The NFC includes a communication which is executed with casings of communication devices kept in contact with each other. In this NFC, one of two communication devices can be fed from the other in a non-contact fashion. The measuring apparatus in which can execute the NFC described above, can communicate with information terminal equipment such as a smartphone, a tablet-type personal computer and a note-type personal computer which are capable of performing NFC.

A mark 21 indicating the position of the first antenna 33 is formed on an outer surface of the cover portion 20 as illustrated in FIG. 1. The surface of a side wall portion 20a of the cover portion 20 where the mark 21 is provided is referred to as a front surface of the measuring apparatus 1. In this embodiment, the mark 21 is made up of a groove or is formed through stamping. However, the mark 21 may be made up of a seal or may be formed through marking. The measuring apparatus 1 can communicate with information terminal equipment through NFC by way of the first antenna 33 by moving the information terminal equipment described above towards the mark 21.

The cover portion 20 has an attachment piece 22 which projects downwards (towards a −Z side) from the bottom portion 20c. Specifically, a pair of left and right attachment pieces 22 is provided to face each other across the center axis O (at intervals of 180°). A through hole 22a and a countersunk portion 22b are formed in each of the pair of attachment pieces 22 as illustrated in FIG. 5. The through hole 22a penetrates the attachment piece 22 in the X-axis direction, and the countersunk portions is formed around the through bole 22a. Screw holes 17 are formed in the outer circumferential surface 10a of the base portion 10, and these screw holes 17 face the corresponding through holes 22a with the cover portion 20 attached to the base portion 10.

A screw 51 can be inserted through each of the through hole 22a to screw into the corresponding screw hole 17. The cover portion 20 is screwed on to the outer circumferential surface 10a of the base portion 10 by tightening the screws 51. Thus, the measuring apparatus 1 includes a screwing mechanism 50 configured to screw the cover portion 20 to the outer circumferential surface 10a of the base portion 10. This screwing mechanism 50 includes the attachment pieces 22 described above, the through holes 22a formed in the attachment pieces 22, the screw holes 17 formed on the outer circumferential surface 10a of the base portion 10 and the screws 51 which are inserted through the through holes 22a to be screwed into the screw holes 17.

The measuring apparatus 1 includes a rotation restricting mechanism 60 configured to restrict a relative rotation (so-called loosening) occurring about the screws 51 between the base portion 10 and the cover portion 20 in the screwing mechanism 50. The rotation restricting mechanism 60 is formed by cutaways 18 formed on the outer circumferential surface 10a of the base portion 10 illustrated in FIG. 5 and engaging grooves 22c formed inside the attachment pieces 22 of the cover portion 20 illustrated in FIG. 6. The cutaways 18 are formed in pair on both sides of each of the screw holes 17 so as to provide a step in the X-axis direction and extend in parallel in the Z-axis direction, as illustrated in FIG. 5. The pair of cutaways 18 forms X-Z planes on both sides of each of portions on the outer circumferential surface 10a of the base portion 10 where the screw hole 17 is formed and make this screw hole 17 forming a projecting portion.

The engaging groove 22c is formed into a recess having a pair of side surfaces (X-Z planes) which can face the pair of cutaways 18 (X-Z planes) so as to accommodate the portion of the base portion 10 where the screw hole 17 is formed (the projecting portion). The pair of side surfaces of the engaging grooves 22c are brought into abutment with the pair of cutaways 18, w hereby a relative rotation occurring about the screws 51 (the X axis) between the base portion 10 and the cover portion 20 can be restricted. The pail of side surfaces of the engaging grooves 22c slide on the pair of cutaways 18 in the Z-axis direction, whereby the rotation restricting mechanism 60 can guide the base portion 10 and the cover portion 20 for attachment to or detachment from each other.

The cover portion 20 is made up of a topped cylindrical resin-molded material and includes the side wall portion 20a. As illustrated in FIG. 1, in the side wall portion 20a, an external shape of a top wall portion 20b is smaller than an external shape of the bottom portion 20c. Thus, the side wall portion 20a has an external shape which is reduced gradually from the bottom portion 20c towards the top wall portion 20b. When referred to herein, the external shape means an outer contour of the cover portion 20 in a section (the X-Z plane) which intersects the center axis O (the Z axis) at right angles. Additionally, that the external shape is smaller at the top wall portion 20b than at the bottom portion 20c means a state where an outer contour of the top wall portion 20b stays in an inner area of an outer contour of the bottom portion 20c when the cover portion 20 is seen from above along the center axis O.

Figure 4:
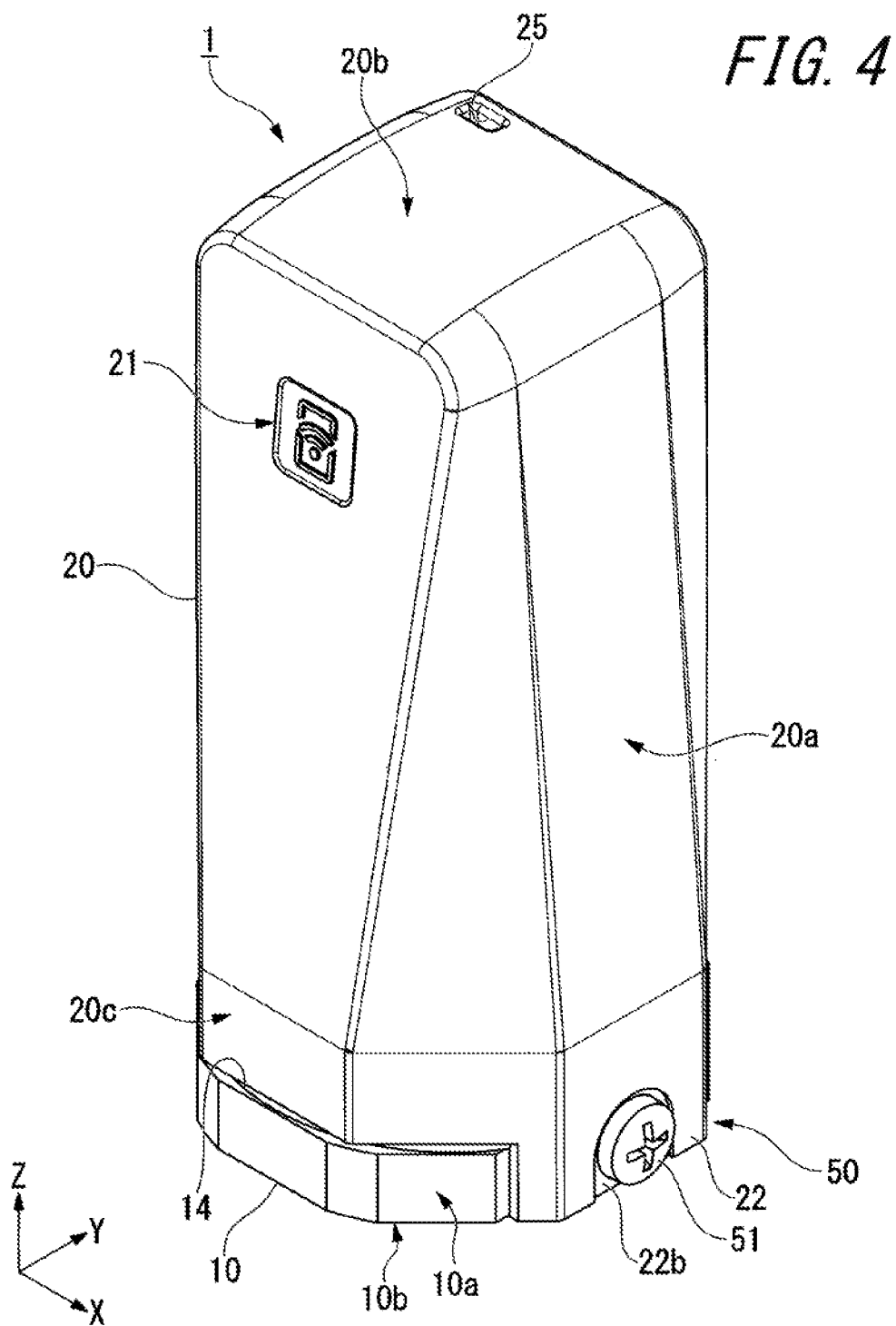
FIG. 4 is a front perspective view of the measuring apparatus illustrated in FIG. 1.
Figure 6:
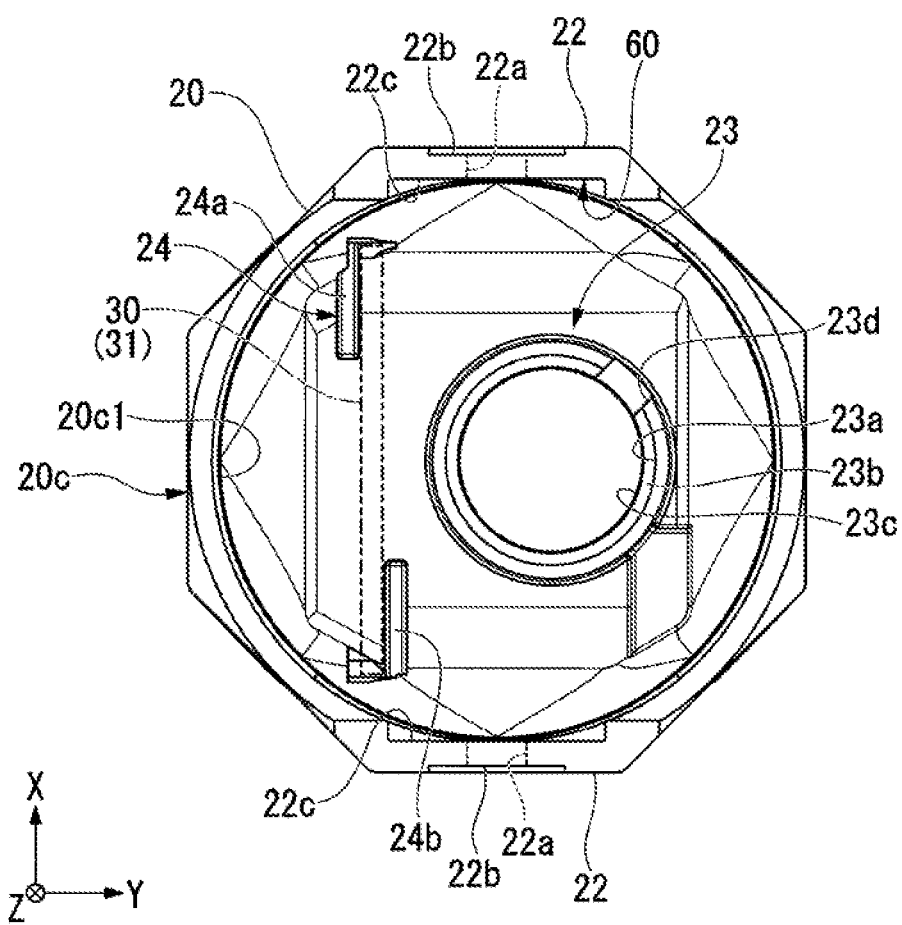
FIG. 6 is a bottom view of a cover portion provided on the measuring apparatus illustrated in FIG. 1.

As illustrated in FIGS. 4 and 5, the bottom portion 20c has a substantially octagonal external shape. The top wall portion 20b has a substantially quadrangular external shape. In the side wall portion 20a, the front surface where the mark 21 is formed and an opposite rear surface have a substantially trapezoidal shape in which a bottom side is shorter than a top side. A left surface and a right surface of the side wall portion 20a have a substantially rectangular shape. Thus, a connecting surface which connects a sloping side of the substantially trapezoidal shape and a long side of the substantially rectangular shape together has a substantially triangular shape. As illustrated in FIG. 6, an inner surface 20c1 of the bottom portion 20c constitutes an inner circumferential surface having a constant diameter, which differs from a polyhedral inner surface of the side wall portion 20a. This enables a gap between the base portion 10 and the cover portion 20 to be sealed up fluid-tightly by measure of the seal ring 16, as illustrated in FIG. 2.

Figure 10:
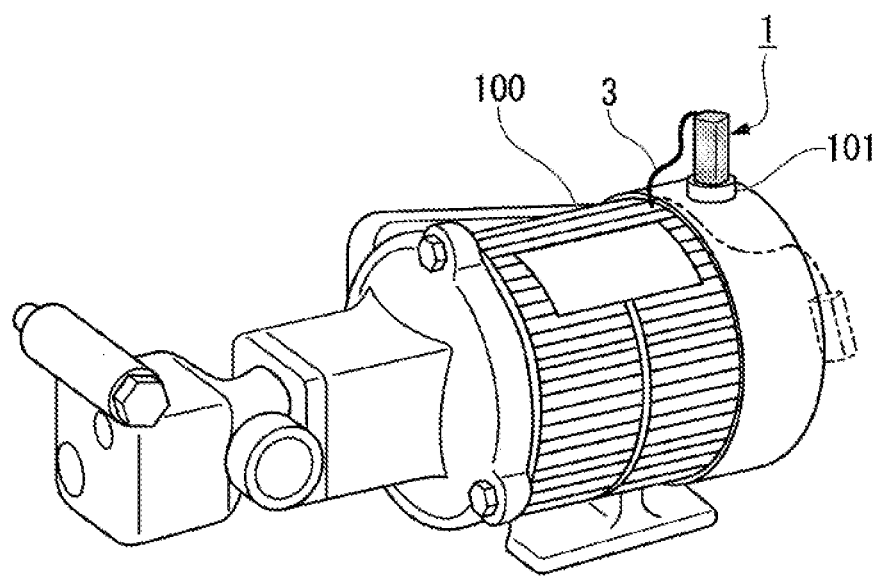
FIG. 10 is a schematic drawing illustrating a state where the measuring apparatus illustrated in FIG. 1 is attached to an attachment target object.

The string attachment hole 25 is formed in the top wall portion 20b of the cover portion 20 as illustrated in FIG. 4. The string attachment hole 25 is formed into an L shape extending from the top wall portion 20b to the rear side of the side wall portion 20a as illustrated in FIG. 5. A string-shaped member 3 (refer to FIG. 10) is passed through the string attachment hole 25, whereby the measuring apparatus 1 can be kept fastened to the attachment target object (the electric motor 100 illustrated in FIG. 10). In FIG. 10, a base 101 is provided on the electric motor 100 where the measuring apparatus 1 is attached, so that the measuring apparatus 1 is magnetically seemed to the base 101 by means of a magnet.

As illustrated in FIG. 2, a battery holding portion 23 (a holding portion) configured to hold the battery 2 and a substrate holding portion 24 configured to hold the substrate 30 are provided on the top wall portion 20b of the cover portion 20 so as to be suspended from the top wall portion 20b. The battery holding portion 23 has a cylindrical shape so as to be brought into engagement with the top portion 2a of the battery 2 with the cover portion 20 attached to the base portion 10. The substrate holding portion 24 holds the upper end portion of the first substrate 31 with the cover portion 20 attached to the base portion 10 and is formed into a pair of plates (a first plate portion 24a and a second plate portion 24b, which will both be described later) which face a front side and a rear side of the upper end portion, respectively. The battery holding portion 23 and the substrate holding portion 24 are both formed in positions deviating from the center axis O and have different shapes from each other.

The battery holding portion 23 includes a first accommodating portion 23a configured to accommodate the top portion 2a of the battery 2, a diametrically contracted portion 23b provided contiguously with the first accommodating portion 23a, a second accommodating portion 23c provided contiguously with the diametrically contracted portion 23b and to accommodate the thermally shrinkable tube 38 extending upwards from the top portion 2a of the battery 2. In the diametrically contracted portion 23b, an inside diameter is gradually reduced in the direction in which the cover portion 20 is attached to or detached from the base portion 10 (the Z-axis direction) as the diametrically contracted portion 23b extends towards the top portion 2a (a +Z side) of the battery 2 with the cover portion 20 attached to the base portion 10. A cutaway 23d (refer to FIG. 6) is formed in the cylindrical battery holding portion 23 for passage of the second connector cable 37. In this embodiment, the battery holding portion 23 has the cylindrical shape since the replaceable object is the battery 2 having the cylindrical shape. However, when the replaceable object has a shape (for example, a prism shape) other than the cylindrical shape, the battery holding portion 23 preferably has a cylindrical shape matching the shape of the replaceable object (for example, an angularly cylindrical shape).

Figure 8A:
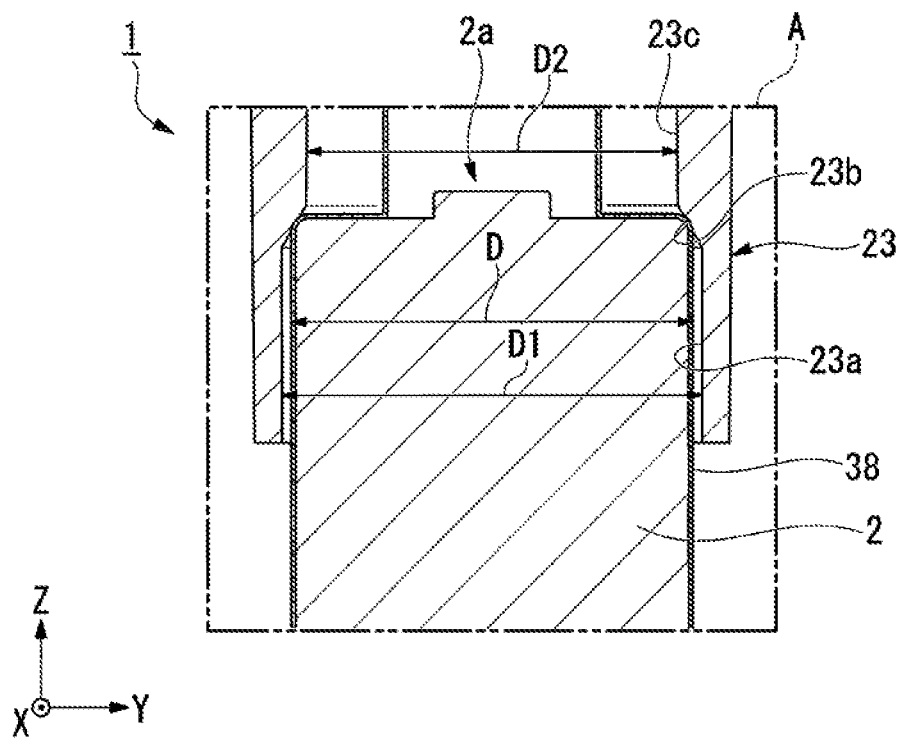
FIG. 8A is an enlarged view of an area A illustrated in FIG. 2.

As illustrated in FIG. 8A, a dimension of the battery holding portion 23 is such that when assuming that a diameter of the battery 2 (including the thermally shrinkable tube 38) is D, D1, which is a diameter (an inside diameter) of the first accommodating portion 23a, is greater than D. For example, D1 is greater by on the order of 5 to 15% than D. On the contrary, D2, which is a diameter (an inside diameter) of the second accommodating portion 23c is smaller than D. For example, the D2 is smaller by on the order of 5 to 15% than D. The diametrically contracted portion 23b constitutes a tapered surface which connects rectilinearly an upper end of the first accommodating portion 23a and a lower end of the second accommodating portion 23c together.

Returning to FIG. 6, the substrate holding portion 24 includes the first plate portion 24a facing the front side of the first substrate 31 and the second plate portion 24b facing the rear side of the first substrate 31. The first plate portion 24a is formed so as to straddle a corner portion between an inner side surface on a +X side of the side wall portion 20a and a lower surface of the top wall portion 20b. The second plate portion 24b is formed so as to straddle a corner portion between an inner side surface on a −X side of the side wall portion 20a and a lower surface of the top wall portion 20b. The first plate portion 24a and the second plate portion 24b are not disposed so as to overlap each other in the front-and-rear direction (the Y-axis direction) but are disposed so as to be staggered or not in line with each other.

Figure 7:
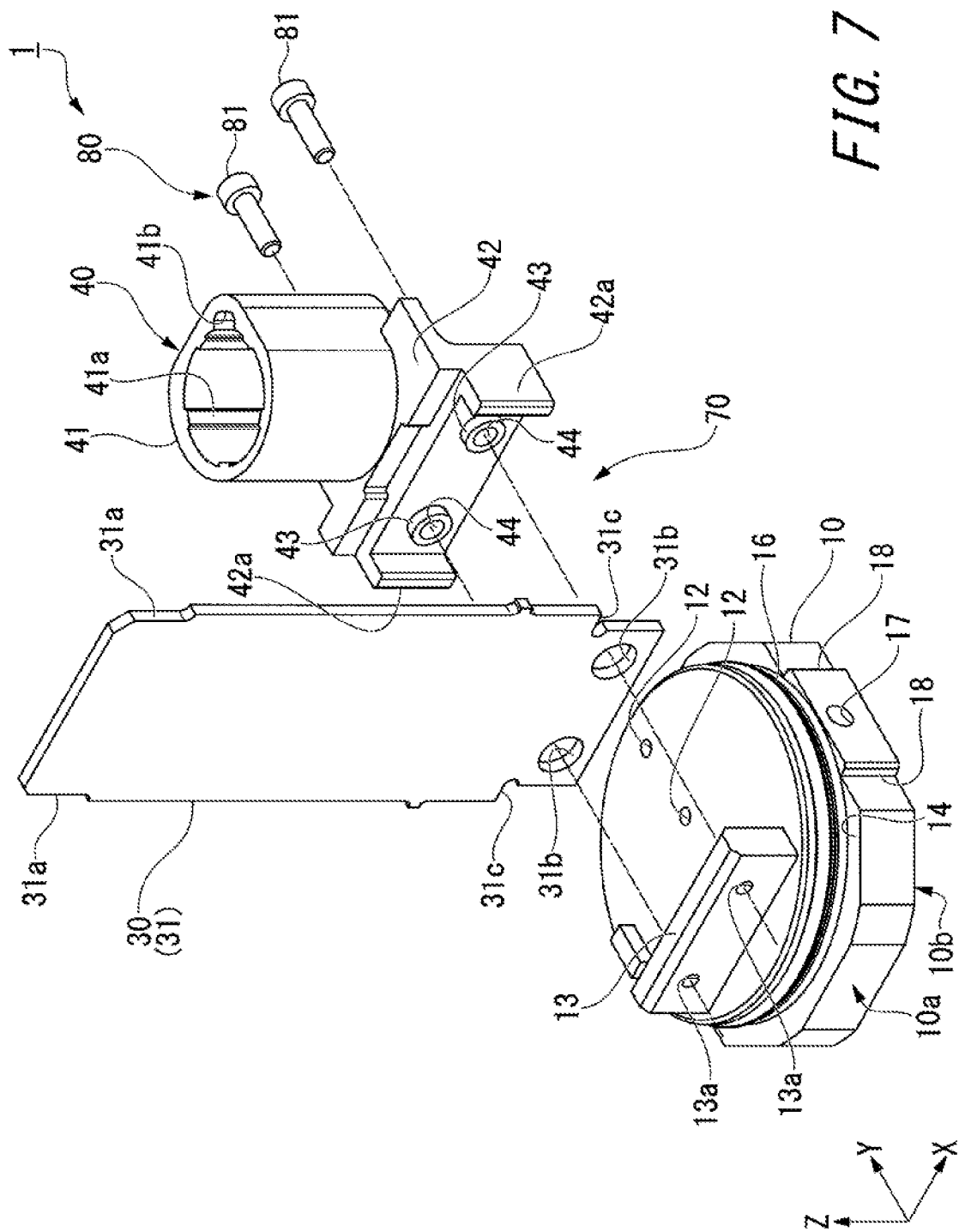
FIG. 7 is an exploded perspective view of a base portion, the substrate and a receiving portion which are provided on the measuring apparatus illustrated in FIG. 1.

Returning to FIG. 2, the base portion 10 has the receiving portion 40 configured to support the longitudinally bottom portion 2b of the battery 2. The receiving portion 40 includes a main body portion 41 having a bottomed cylindrical shape and configured to support the bottom portion 2b of the battery 2 and a support portion 42 provided contiguously with a bottom portion of the main body portion 41 and configured to support the main body portion 41 above the second substrate 32. As illustrated in FIG. 7, the support portion 42 includes boss portions 43 configured to be brought into engagement with the first substrate 31 and through holes 44 formed so as to penetrate the corresponding boss portions 43. The through holes 44 can face the corresponding screw holes 13a formed in the fixing portion 13 on the base portion 10. Then, the receiving portion 40 is attached to the base portion 10 together with the first substrate 31 by screwing screws 81 through the through holes 44 into the screw holes 13a.

Specifically, as illustrated in FIG. 7, the support portion 42 is formed info an inverted L shape, and the cylindrical boss portions 43 are provided on a front side (a −Y side) which faces the first substrate 31 so as to project therefrom. Through holes 31b are formed in a lower portion of the first substrate 31 so that the cylindrical boss portions 43 can be inserted through them. The boss portions 43 and the through holes 31b are each formed in pair so as to match the screw holes 13a of the fixing portion 13. Ribs 41a are formed at intervals in a circumferential direction on an inner circumferential surface of the main body portion 41 supported on the support portion 42, and a groove 41b is formed on the inner circumferential surface for passage of the second connector cable 37.

The support portion 42 includes a pair of support ribs 42a configured to hold the first substrate 31 therebetween in a left-and-right width direction (the X-axis direction). A pair of cutaways 31c is formed at the lower portion of the first substrate 31 which can rest on upper surfaces of the pair of support ribs 42a. As illustrated in FIG. 2, with the pair of cutaways 31c resting in the upper surfaces of the pair of support ribs 42a, a lower end of the first substrate 31 is not in contact with the top surface 10c of the base portion 10. This is because a longitudinal dimension of the first substrate 31 varies length (a projecting amount) of the boss portions 43 is made smaller than a thickness of the first substrate 31. A pair of cutaways 31a formed in an upper portion of the first substrate 31 illustrated in FIG. 7 is designed to avoid an interference with the cover portion 20 whose external shape is smaller.

The boss portions 43 are inserted through the through holes 31b, and the pair of cutaways 31c rests on the upper surfaces of the pair of support ribs 42a, whereby the first substrate 31 can be brought into engagement with the receiving portion 40. In this way, the measuring apparatus 1 includes an engagement mechanism 70 configured to bring the first substrate 31 into engagement with the receiving portion 40. This engagement mechanism 70 includes the boss portions 43 formed on the support portion 42 described above, the pair of support ribs 42a, the through holes 31b formed in the first substrate 31 and the pair of cutaways 31c. The measuring apparatus 1 includes an attachment mechanism 80 configured to attach the first substrate 31 and the receiving portion 40, engaged with each other by the engagement mechanism 70, integrally to the base portion 10.

The attachment mechanism 80 includes the through holes 44 penetrating the boss portions 43, the screw holes 13a formed in the fixing portion 13 of the base portion 10, and the screws 81 passed through the through holes 44 to be screwed into the screw holes 13a. A length (a projecting amount) of the pair of support ribs 42a is made greater than the thickness of the first substrate 31, so that the pair of support ribs 42a can hold the fixing portion 13 of the base portion 10 therebetween in the left-and-right width direction (the X-axis direction) together with the first substrate 31. This can enable the receiving portion 40 with which the first substrate 31 is in engagement to be positioned properly with respect to the fixing portion 13, facilitating the screwing operation using the screws 81.

Returning to FIG. 2, an elastic portion 45 is provided on a bottom surface of the main body portion 41 of the receiving portion 40. The elastic portion 45 is formed of an elastic material such as a silicone rubber, for example. The elastic portion 45 is brought into abutment with the bottom portion 2b of the battery 2 and can be deformed elastically in the direction in which the cover portion 20 is attached to or detached from the base portion 10 (the Z-axis direction). Specifically, on a circumferential portion of a bottom surface of the elastic portion 45, a portion other than a circumferential portion (for example, a portion lying near a center) of the bottom surface is formed in a concave shape in upward direction, whereby a space is formed between the bottom surface of the main body portion 41 and the elastic portion 45. A relief groove 46 is formed on the bottom surface of the elastic portion 45 to form the space for elastic deformation of the elastic portion 45. In this embodiment, the relief groove 46 is formed on the bottom surface of the elastic portion 45 as the upwardly oriented concavity, but the relief groove 46 may be formed into downwardly oriented concavity on the bottom surface of the main body portion 41. A diametrically contracted elastic portion 47 is formed on an upper surface of the elastic portion 45. This diametrically contracted elastic portion 47 has an inside diameter which is reduced gradually as it extends towards the bottom surface (the −Z side) of the main body portion 41 in its restored state in which for example, the cover portion 20 is detached from the base portion 10, so that the battery 2 is removed from the main body portion 41 and the diametrically contracted elastic portion 47 is not in abutment with the bottom portion 2b of the battery 2 (a state indicated by a chain double-dashed line in FIG. 2).

Figure 8B:
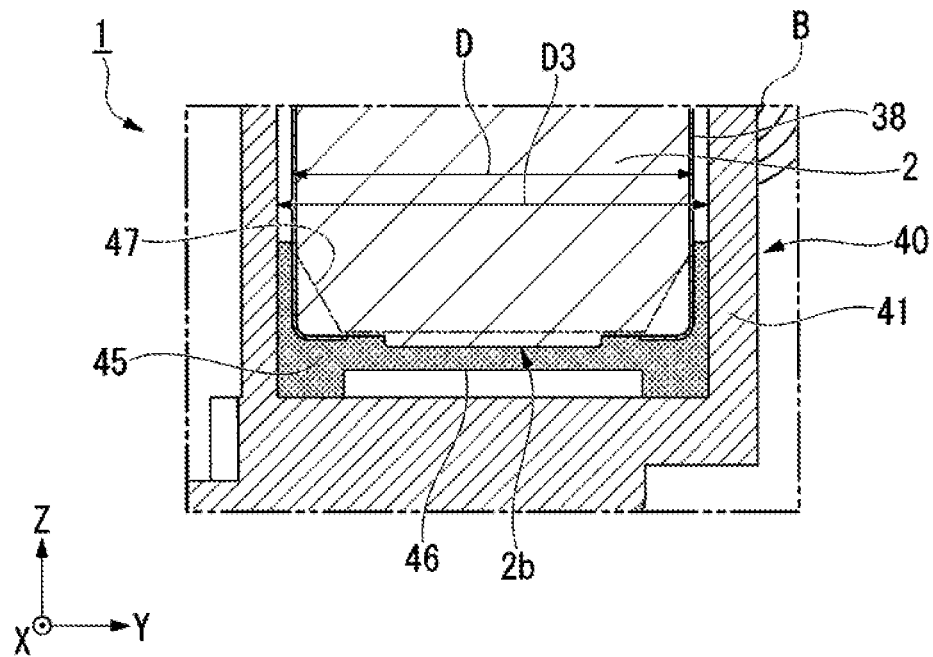
FIG. 8B is an enlarged view of an area B illustrated in FIG. 2.

As illustrated in FIG. 8B, a dimension of the receiving portion 40 is such that when assuming that the diameter of the battery 2 (including the thermally shrinkable tube 38) is D, D3, which is a diameter of the main body portion 41 (specifically, an inside diameter defined by the ribs 41a illustrated in FIG. 7), is greater than D. For example, the D3 is greater by on the order of 5 to 15% than D. D3 may be greater than D1, which is the diameter (the inside diameter) of the first accommodating portion 23a illustrated in FIG. 8A. The diametrically contracted elastic portion 47 is elastically deformed by a corner portion at the bottom portion 2b of the battery 2 but forms a tapered surface in its restored state (the state where the battery 2 is removed from the main body portion 41).

Thus, as has been described heretofore, according to the measuring apparatus 1 configured as described above, as illustrated in FIG. 9A, the battery holding portion 23 configured to hold the rod-shaped battery 2 is provided on the cover portion 20 which can be attached to and detached from the base portion 10. Thus, as illustrated in FIG. 9B, the battery 2 can be fixed simply by attaching the cover portion 20 to the base portion 10. In this way, according to the embodiment of the disclosure, the battery 2 can be fixed in place by the cover portion 20 without preparing a separate clamp member, although the conventional technique requires the preparation of such a separate clamp member. Hence, the number of components involved in the fixing structure of the battery 2 can be reduced, and the replacing operation of the battery 2 can be facilitated, whereby the low-cost measuring apparatus 1 can be realized.

In this embodiment, the receiving portion 40 is provided on the base portion 10 which supports the longitudinally bottom portion 2b of the battery 2, and the battery holding portion 23 is configured to be brought into engagement with the longitudinally top portion 2a of the battery 2 which is not supported by the receiving portion 40. According to this configuration, both the ends of the longitudinally bottom portion 2b and top portion 2a of the battery 2 can be fixed in place, whereby the rod-shaped battery 2 can be fixed stably in the perpendicular posture.

In this embodiment, the battery holding portion 23 has the cylindrical shape enabling it to be brought into engagement with the top portion 2a in the direction in which the cover portion 20 is attached to or detached from the base portion 10 (the Z-axis direction). According to this configuration, the direction in which the cover portion 20 is attached to or detached from the base portion 10 coincides with the engaging direction of the battery holding portion 23 with the top portion 2a of the battery 2. Hence, the battery holding portion 23 can be brought into engagement with or disengagement from the top portion 2a at the same time as the cover portion 20 is attached to or detached from the base portion 10. This facilitates the replacing operation of the battery 2.

Further, in the embodiment, the battery holding portion 23 has the diametrically contracted portion 23b whose inside diameter is gradually reduced as the battery holding portion 23 extends towards the top portion 2a of the battery 2 in the direction in which the cover portion 20 is attached or detached, with the cover portion 20 attached to the base portion 10. According to this configuration, even though the outer diametrical dimension of the top portion 2a of the battery 2 varies, the top portion 2a of the battery 2 can be fixed stably since the diametrically contracted portion 23b provided on the battery holding portion 23 can be tightly secured to the top portion 2a of the battery 2.

In addition, in the embodiment, the receiving portion 40 has the elastic portion 45 configured to be brought into abutment with the bottom portion 2b of the battery 2, the elastic portion 45 being elastically deformable in the direction in which the cover portion 20 is attached to or detached from the base portion 10. According to this configuration, even though the longitudinal dimension of the battery 2 varies, the attachment of the cover portion 20 to the base portion 10 is not interrupted since the elastic portion 45 provided on the receiving portion 40 deforms elastically in the Z-axis direction. Thus, the battery 2 can be fixed in place by absorbing the variation in the longitudinal dimension of the battery 2, if any, by the elastic deformation of the elastic portion 45.

Further, in the embodiment, the space is formed between the main body of the receiving portion 40 and the elastic portion 45 by the relief groove 46 formed on the elastic portion 45, the space being configured to allow the elastic deformation of the elastic portion 45. According to this configuration, when the elastic portion 45 deforms elastically, part of the elastic portion 45 can be relieved into the space formed between the main body of the receiving portion 40 and the elastic portion 45, increasing the amount of deformation of the elastic portion 45 in the direction in which the cover portion 20 is attached or detached. This prevents the interruption of attachment of the cover portion 20 to the base portion 10 even though the longitudinal dimension of the battery 2 varies more largely, whereby the battery 2 can be fixed in place by absorbing the variation in the longitudinal dimension of the battery 2, if any, by the elastic deformation of the elastic portion 45.

In addition, in the embodiment, the receiving portion 40 has the main body portion 41 having the bottomed cylindrical shape on the bottom surface of which the elastic portion 45 is provided, and the elastic portion 45 has the diametrically contracted elastic portion 47 whose inside diameter is gradually reduced as the elastic portion 45 extends towards the bottom surface of the main body portion 41 in the direction in which the cover portion 20 is attached or detached in its restored state where the elastic portion 45 is not in abutment with the bottom portion 2b of the battery 2. According to this configuration, even though the outer diametrical dimension of the bottom portion 2b of the battery 2 varies as with the top portion 2a of the battery 2, the bottom portion 2b of the battery 2 can be supported stably since the diametrically contracted elastic portion 47 provided on the elastic portion 45 can be tightly secured to the bottom portion 2b of the battery 2.

Further, in the embodiment, as illustrated in FIG. 7, the measuring apparatus 1 includes the engagement mechanism 70 configured to bring the first substrate 31 into engagement with the receiving portion 40 and the attachment mechanism 80 configured to attach integrally the first substrate 31 and the receiving portion 40 which are brought into engagement with each other by the engagement mechanism 70 to the base portion 10. According to this configuration, the first substrate 31 and the receiving portion 40 can integrally be attached to the base portion 10 while being in engagement with each other. This can reduce the number of components involved more than in a structure in which the first substrate 31 and the receiving portion 40 are separately and individually attached to the base portion 10, thereby making it possible to realize low costs.

In this embodiment, as illustrated in FIG. 2, the first substrate 31 is attached to the base portion 10 in the erected state, and the cover portion 20 includes the substrate holding portion 24 configured to hold the upper end portion of the first substrate 31. According to this configuration, the cover portion 20 also holds the upper end portion of the first substrate 31 together with the battery 2. Hence, the attaching direction of the cover portion 20 to the base portion 10 can be understood easily, whereby the cover portion 20 can be prevented from being attached to the base portion 10 in the reverse direction, and the cover portion 20 can easily and simply be attached to the base portion 10.

In this embodiment, the cover portion 20 includes the string attachment hole 25 illustrated in FIG. 4, and as illustrated in FIG. 10, the string attachment hole 25 allows attachment to the electric motor 100, which is the example of the attachment target object, via the string-shaped member 3. According to this configuration, the measuring apparatus 1 can be kept fastened to the attachment target object with the string-shaped member 3 by passing the string-shaped member 3 through the string attachment hole 25 of the cover portion 20. Hence, the measuring apparatus 1 can be prevented from falling off the attachment target object and being lost or being damaged as a result of the fall off the attachment target object.

Thus, according to the embodiment of this disclosure, by adopting the configuration in which the measuring apparatus 1 includes the base portion 10 attachable to the attachment target object and the cover portion 20 detachably attached to the base portion 10 and configured to accommodate the rod-shaped battery 2 inside it, and the cover portion 20 includes the battery holding portion 23 configured to hold the battery 2 with the cover portion 20 attached to the base portion 10, the measuring apparatus 1 can be obtained which can reduce the number of components involved in the fixing structure of the battery 2, which is the rod-shaped replaceable object and realize the easy and low-cost replacing operation of the battery 2.

Thus, while the preferred embodiment of this disclosure has been described by reference to the drawings, the disclosure is not limited to the embodiment described heretofore. The shapes and combinations of the constituent members illustrated in the embodiment are only the examples and hence can be modified variously based on design requirements without departing from the spirit and scope of the disclosure.

In the embodiment, the sensor 35 is described as being accommodated inside the cover portion 20. However, the disclosure is not limited to this configuration. For example, a configuration may be adopted in which the sensor is externally attached to the measuring apparatus 1 by way of a cable, so that measuring results are input into the measuring apparatus 1 from the sensor externally attached to the measuring apparatus 1. Specifically speaking, a configuration may be adopted in which a sensor for measuring a temperature is attached to a measurement target object, and a cable from the sensor is connected to the measuring apparatus 1, so that au output (for example, an analog voltage) is input into the measuring apparatus 1.

The battery 2 accommodated inside the cover portion 20 may supply electric power not only to the measuring apparatus 1 but also to an externally attached sensor as one described above.

In the embodiment, while the base portion 10 and the receiving portion 40 are configured as the separate members, the base portion 10 and the receiving portion 40 may be integrated into one member.

In the embodiment, while the mark 21 is described as being formed to indicate the position of the first antenna 33, the disclosure is not limited to this configuration. For example, the mark 21 may not be formed. For example, a part of the cover portion 20 is formed into a planar shape without being formed the mark 21, while the other portion is formed into a curved surface, and the substrate holding portion 24 is provided so that the first antenna 33 is disposed to face the flat surface portion. According to this configuration, the position of the first antenna 33 can roughly be determined from the outside of the cover portion 20.

The invention claimed is:

1. A measuring apparatus comprising:
a base portion attachable to an attachment target object; and
a cover portion configured to be detachably attached to the base portion to accommodate a rod-shaped replaceable object inside the cover portion,
wherein the base portion includes a receiving portion that comprises a main body portion having a bottomed cylindrical shape into which a longitudinally bottom portion of the replaceable object is to be inserted, the main body portion being configured to support the inserted longitudinally bottom portion of the replaceable object, and
wherein the cover portion comprises a battery holding portion configured to engage with a longitudinally top portion of the replaceable object, which is not supported by the main body portion having the bottomed cylindrical shape comprised in the receiving portion, to thereby hold the longitudinally top portion of the replaceable object with the cover portion attached to the base portion.

2. The measuring apparatus according to claim 1,
wherein the battery holding portion has a cylindrical shape enabling the battery holding portion to be brought into engagement with the top portion in a direction in which the cover portion is attached to or detached from the base portion.

3. The measuring apparatus according to claim 2,
wherein the battery holding portion has a diametrically contracted portion whose inside diameter is gradually reduced as the battery holding portion extends towards the top portion in the direction in which the cover portion is attached or detached, with the cover portion attached to the base portion.

4. The measuring apparatus according to claim 1,
wherein the receiving portion has an elastic portion configured to be brought into abutment with the bottom portion, the elastic portion being elastically deformable in a direction in which the cover portion is attached to or detached from the base portion.

5. The measuring apparatus according to claim 4,
wherein a space is formed between a main body of the receiving portion and the elastic portion, the space being configured to allow an elastic deformation of the elastic portion.

6. The measuring apparatus according to claim 4,
wherein the elastic portion is provided to a bottom surface of the main body portion, and
wherein the elastic portion comprises a diametrically contracted elastic portion whose inside diameter is gradually reduced as the elastic portion extends towards the bottom surface of the main body portion in the direction in which the cover portion is attached or detached in a restored state where the elastic portion is not in abutment with the bottom portion.

7. The measuring apparatus according to claim 1, comprising:
a substrate on which a communication part is provided, the communication part being configured to transmit a measurement result of a sensor to outside;
an engagement mechanism configured to bring the substrate into engagement with the receiving portion; and
an attachment mechanism configured to attach integrally the substrate and the receiving portion which are brought into engagement with each other by the engagement mechanism to the base portion.

8. The measuring apparatus according to claim 7,
wherein the substrate is attached to the base portion in an erected state, and
wherein the cover portion comprises a substrate holding portion configured to hold an upper end portion of the substrate.

9. The measuring apparatus according to claim 1,
wherein the replaceable object is a battery.

10. The measuring apparatus according to claim 1,
wherein the cover portion comprises a string attachment hole configured to allow attachment to the attachment target object via a string-shaped member.

11. The measuring apparatus according to claim 1,
wherein the battery holding portion has a length shorter than the length of the rod-shaped replaceable object such that the battery holding portion does not reach a bottom of the rod-shaped replaceable object when holding the rod-shaped replaceable object, and such that the rod-shaped replaceable object is released from the battery holding portion by moving the battery holding portion along a side surface of the rod-shaped replaceable object.

12. A measuring apparatus comprising:
a base portion attachable to an attachment target object; and
a cover portion configured to be detachably attached to the base portion to accommodate a rod-shaped replaceable object inside the cover portion,
wherein the cover portion comprises a battery holding portion configured to hold the replaceable object with the cover portion attached to the base portion, and
wherein the battery holding portion has a length shorter than the length of the rod-shaped replaceable object such that the battery holding portion does not reach a bottom of the rod-shaped replaceable object when holding the rod-shaped replaceable object, and such that the rod-shaped replaceable object is released from the battery holding portion by moving the battery holding portion along a side surface of the rod-shaped replaceable object.

* * * * *